(12) United States Patent
Sudo

(10) Patent No.: US 8,867,162 B2
(45) Date of Patent: Oct. 21, 2014

(54) MAGNETIC DISK DEVICE AND DEMODULATION POSITION CORRECTING METHOD

(71) Applicant: Kabushiki Kaisha Toshiba, Tokyo (JP)

(72) Inventor: Daisuke Sudo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/758,781

(22) Filed: Feb. 4, 2013

(65) Prior Publication Data

US 2014/0078614 A1 Mar. 20, 2014

(30) Foreign Application Priority Data

Sep. 19, 2012 (JP) .................. 2012-205594

(51) Int. Cl.
 G11B 5/596 (2006.01)
 G11B 21/02 (2006.01)
 G11B 11/00 (2006.01)
(52) U.S. Cl.
 CPC ............... G11B 21/02 (2013.01); *G11B 11/00* (2013.01); G11B 5/59627 (2013.01); G11B 5/59655 (2013.01)
 USPC .................... 360/77.08; 360/77.02
(58) Field of Classification Search
 None
 See application file for complete search history.

(56) References Cited

U.S. PATENT DOCUMENTS

| | | | |
|---|---|---|---|
| 4,549,232 A | 10/1985 | Axmear et al. | |
| 5,689,384 A | 11/1997 | Albrecht et al. | |
| 6,046,879 A | 4/2000 | Hampshire | |
| 6,067,204 A | 5/2000 | Tremaine | |
| 6,078,460 A * | 6/2000 | Moriya | ............ 360/77.04 |
| 6,590,729 B1 | 7/2003 | Akagi et al. | |
| 6,853,514 B2 | 2/2005 | Li et al. | |
| 6,922,304 B2 | 7/2005 | Nakagawa | |
| 7,209,314 B2 | 4/2007 | Bandic et al. | |
| 7,312,946 B2 | 12/2007 | Asakura et al. | |
| 7,430,082 B2 | 9/2008 | Heydari et al. | |
| 7,440,224 B2 | 10/2008 | Ehrlich et al. | |
| 7,457,066 B2 | 11/2008 | Ehrlich et al. | |
| 7,529,059 B2 | 5/2009 | Ryu et al. | |
| 7,859,778 B1 | 12/2010 | Vikramaditya et al. | |
| 7,859,787 B2 | 12/2010 | Kisaka | |
| 8,023,219 B2 | 9/2011 | Kosugi | |
| 8,295,002 B1 | 10/2012 | Katchmart | |

(Continued)

FOREIGN PATENT DOCUMENTS

| | | |
|---|---|---|
| JP | 07-065306 | 3/1995 |
| JP | 08-249842 A | 9/1996 |

(Continued)

OTHER PUBLICATIONS

U.S. Appl. No. 61/822,565, filed May 13, 20013, Yamada.

(Continued)

*Primary Examiner* — Andrew L Sniezek
(74) *Attorney, Agent, or Firm* — Knobbe Martens Olson & Bear LLP

(57) ABSTRACT

According to one embodiment, a magnetic head, a magnetic disk and a magnetic recording controller are provided. The magnetic disk has a burst pattern recorded thereon for determining a position of the magnetic head on a track based on a reading result by the magnetic head. The magnetic recording controller corrects a demodulation position of the magnetic head based on an offset correction value subject to fluctuation of the burst pattern.

20 Claims, 10 Drawing Sheets

(56) References Cited

U.S. PATENT DOCUMENTS

| | | | |
|---|---|---|---|
| 8,625,230 | B2 | 1/2014 | Kosugi et al. |
| 2004/0080863 | A1 | 4/2004 | Nakagawa |
| 2009/0040641 | A1 | 2/2009 | Ehrlich et al. |
| 2011/0063751 | A1 | 3/2011 | Yasuna et al. |
| 2012/0293885 | A1 | 11/2012 | Kosugi et al. |
| 2014/0078614 | A1 | 3/2014 | Sudo |

FOREIGN PATENT DOCUMENTS

| | | |
|---|---|---|
| JP | 2000-514585 | 10/2000 |
| JP | 2001-110027 | 4/2001 |
| JP | 2004-145968 A | 5/2004 |
| JP | 2006-309843 | 11/2006 |
| JP | 2009-110597 | 5/2009 |
| JP | 2010-049742 A | 3/2010 |
| JP | 4649421 | 12/2010 |
| JP | 2012-243367 | 12/2012 |
| JP | 2014-059932 | 4/2014 |
| WO | WO 2008/139603 | 11/2008 |

OTHER PUBLICATIONS

U.S. Appl. No. 14/081,908, filed Nov. 15, 2013, K.K. Toshiba.
U.S. Appl. No. 14/018,212, filed Sep. 4, 2013, K.K. Toshiba.
U.S. Appl. No. 14/194,482, filed Feb. 28, 2014, K.K. Toshiba.

* cited by examiner

● : N PHASE PEAK   ○ : Q PHASE PEAK
■ : N PHASE ZERO CROSS   □ : Q PHASE ZERO CROSS

| ZONE | N PHASE OFFSET CORRECTION VALUE | Q PHASE OFFSET CORRECTION VALUE |
|---|---|---|
| Z1 | $V_{Nf1}$ | $V_{Qf1}$ |
| Z2 | $V_{Nf2}$ | $V_{Qf2}$ |
| ⋮ | ⋮ | ⋮ |
| Zm | $V_{Nfm}$ | $V_{Qfm}$ |

MAGNETIC DISK DEVICE AND DEMODULATION POSITION CORRECTING METHOD

CROSS-REFERENCE TO RELATED APPLICATIONS

This application is based upon and claims the benefit of priority from Japanese Patent Application No. 2012-205594, filed on Sep. 19, 2012; the entire contents of which are incorporated herein by reference.

FIELD

Embodiments described herein relate generally to a magnetic disk device and a demodulation position correcting method.

BACKGROUND

A magnetic disk device takes in a sector cylinder number in servo data and burst data indicating information of a position on a track, and positions a magnetic head based on this information.

DETAILED DESCRIPTION

According to an embodiment, a magnetic head, a magnetic disk and a magnetic recording controller are provided. The magnetic disk has a burst pattern recorded thereon for determining a position of the magnetic head on a track based on a reading result by the magnetic head. The magnetic recording controller corrects a demodulation position of the magnetic head based on an offset correction value subject to fluctuation of the burst pattern.

A magnetic disk device according to embodiments will be described in detail below with reference to the accompanying drawings. In addition, the present invention is by no means limited to these embodiments.

First Embodiment

Figure 1:
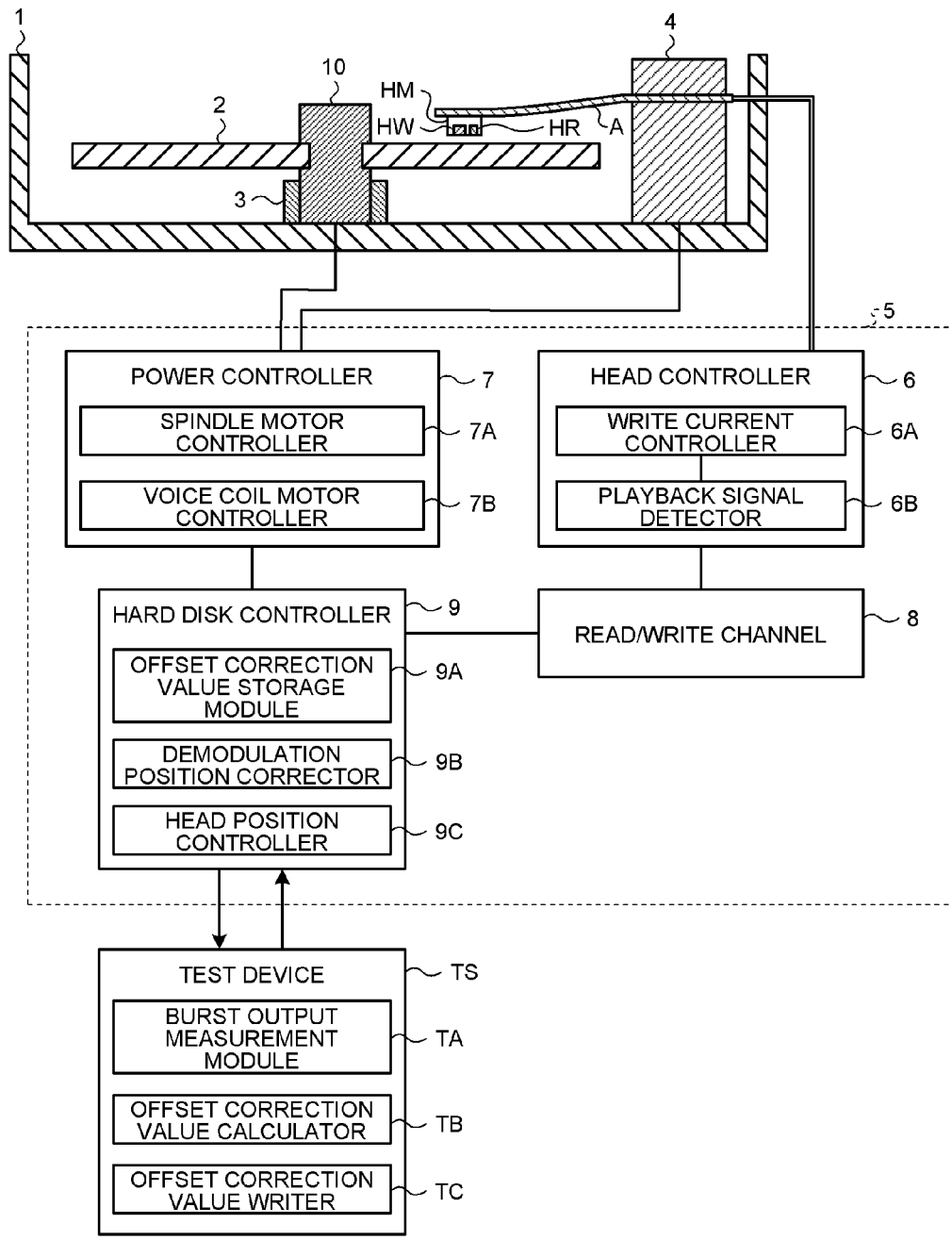
FIG. 1 is a block diagram illustrating a schematic configuration of a magnetic disk device according to a first embodiment.
Figure 2:
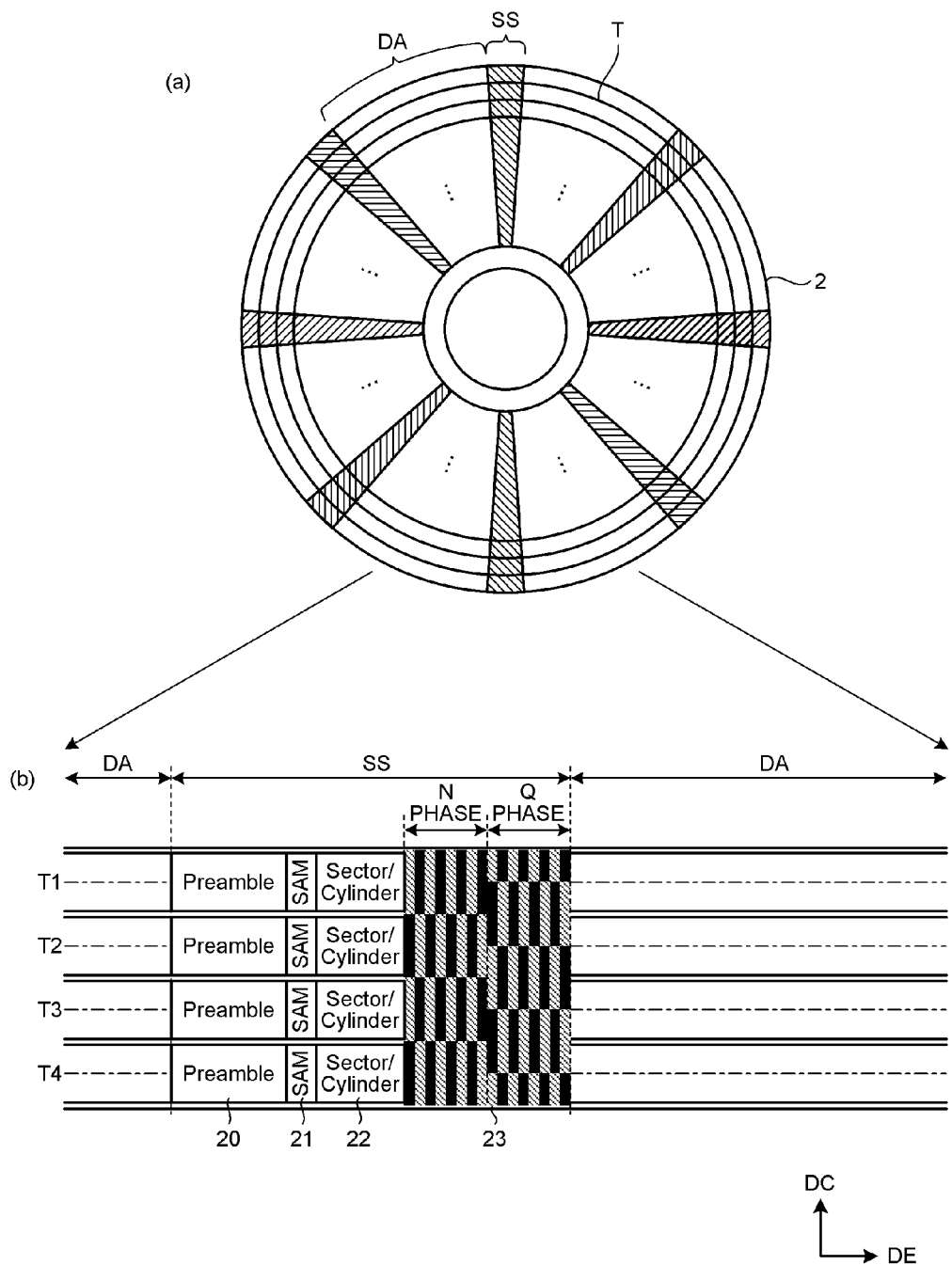
FIG. 2A is a plan view illustrating a track arrangement in a magnetic disk in FIG. 1.
FIG. 2B is a view illustrating a configuration example of servo areas in FIG. 2A.

FIG. 1 is a block diagram illustrating a schematic configuration of a magnetic disk device according to a first embodiment, FIG. 2A is a plan view illustrating a track arrangement in a magnetic disk in FIG. 1, and FIG. 2B is a view illustrating a configuration example of a servo area in FIG. 2A.

In FIG. 1, the magnetic disk device has a magnetic disk 2, and the magnetic disk 2 is supported through a spindle 10. Further, the magnetic disk device has a magnetic head HM, and the magnetic head HM has a write head HW and a read head HR. Further, the write head HW and the read head HR are arranged to face the magnetic disk 2. Meanwhile, the magnetic head HM is held on the magnetic disk 2 through an arm A. The arm A can slide the magnetic head HM in a horizontal plane.

Meanwhile, as illustrated in FIGS. 2A and 2B, the magnetic disk 2 has tracks T along a circumferential direction DE. Each track T has data areas DA in which user data is written, and servo areas SS in which servo data is written. Meanwhile, the servo areas SS are arranged in a radial pattern, and the data areas DA are arranged between servo areas SS. As illustrated in FIG. 2B, in the servo area SS, a preamble 20, a servo area mark 21, a sector/cylinder information 22 and a burst pattern 23 are written. In addition, the sector/cylinder information 22 can apply a servo address of the magnetic disk 2 in a circumferential direction and a radial direction, and can be used to perform seek control of moving the magnetic head HM to a target track. The burst pattern 23 can be used to perform tracking control of positioning the magnetic head HM in a range of the target track. Further, these items of servo data may be recorded in the magnetic disk 2 by way of self servo writing, or may be recorded in the magnetic disk 2 by means of a dedicated servo writer.

Meanwhile, for the burst pattern 23, a null-type burst pattern including an N phase and a Q phase can be used. Magnetization patterns of the N phase and the Q phase can be arranged such that the polarities of the N phase and the Q phase are alternately inverted between intervals of 180 degrees (=1 cyl) in a cross track direction. Further, phases of the N phase and the Q phase can be shifted 90 degrees (=0.5 cyl) in the cross track direction DC. For example, the N phase can be arranged such that the polarity is inverted at boundaries of the adjacent tracks T1 to T4, and the Q phase can be arranged such that the polarity is inverted at the centers of the tracks T1 to T4.

Back to FIG. 1, the magnetic disk device has a voice coil motor 4 which drives the arm A, and has a spindle motor 3 which rotates the magnetic disk 2 through the spindle 10. Further, the magnetic disk 2, the magnetic head HM, the arm A, the voice coil motor 4, the spindle motor 3 and the spindle 10 are accommodated in a case 1.

Furthermore, the magnetic disk device has a magnetic recording controller 5, and the magnetic recording controller 5 has a head controller 6, a power controller 7, a read/write channel 8, and a hard disk controller 9. Meanwhile, the magnetic recording controller 5 can correct a demodulation position of the magnetic head HM based on an offset correction value subject to pitch fluctuation of the burst pattern 23.

Further, the head controller 6 has a write current controller 6A and a playback signal detector 6B. The power controller 7 has a spindle motor controller 7A and a voice coil motor controller 7B. The hard disk controller 9 has an offset correction value storage module 9A, a demodulation position corrector 9B and a head position controller 9C.

The head controller 6 can amplify and detect signals upon recording or playback. The write current controller 6A can control a write current flowing in the write head HW. The playback signal detector 6B can detect a signal read by the read head HR.

The power controller 7 can drive the voice coil motor 4 and the spindle motor 3. The spindle motor controller 7A can control rotation of the spindle motor 3. The voice coil motor controller 7B can control driving of the voice coil motor 4.

The read/write channel 8 can pass data between the head controller 6 and the hard disk controller 9. In addition, data includes read data, write data and servo data. For example, the read/write channel 8 can convert a signal to be played back by the read head HR into a data format to be processed by a host HS, or convert data to be outputted from the host HS into a signal format to be recorded in the write head HW. Such format conversion includes DA conversion or encoding. Further, the read/write channel 8 can decode a signal played back by the read head HR, or modulate a code of data to be outputted from the host HS.

The hard disk controller 9 can perform recording playback control based on an instruction from an outside, or pass data between the outside and the read/write channel 8. The offset correction value storage module 9A can store an offset correction value subject to pitch fluctuation of the burst pattern 23. The demodulation position corrector 9B can correct the demodulation position of the magnetic head HM based on the offset correction value stored in the offset correction value storage module 9A. The head position controller 9C can control the position of the magnetic head HM based on a correction result of the demodulation position of the magnetic head HM.

Further, in process of testing magnetic disk devices before product shipping, the magnetic recording controller 5 is connected to a test device TS. The test device TS has a burst output measurement module TA, an offset correction value calculator TB and an offset correction value writer TC. The burst output measurement module TA can measure a burst output obtained from the burst pattern 23 read by the magnetic head HM. The offset correction value calculator TB can calculate an offset correction value based on the burst output measured by the burst output measurement module TA. The offset correction value writer TC can write the offset correction value calculated by the offset correction value calculator TB, in the offset correction value storage module 9A.

Further, a signal is read from the magnetic disk 2 through the read head HR while the magnetic disk 2 is rotated by the spindle motor 3, and is detected by the playback signal detector 6B. The signal detected by the playback signal detector 6B is converted into data by the read/write channel 8, and is sent to the hard disk controller 9. Further, the hard disk controller 9 calculates the demodulation position of the magnetic head HM based on the burst pattern 23 detected by the playback signal detector 6B, and performs tracking control such that the magnetic head HM traces the track T based on the demodulation position.

In this case, the burst pattern 23 is sent to the test device TS through the hard disk controller 9. Further, a burst output is measured from the burst pattern 23 by the burst output measurement module TA, and is sent to the offset correction value calculator TB. Furthermore, an offset correction value is calculated by the offset correction value calculator TB based on the burst output measured in the burst output measurement module TA, and is written in the offset correction value storage module 9A through the offset correction value writer TC. In addition, for this burst output, a DFT coefficient (a coefficient of discrete Fourier transform) of a burst output fundamental wave can be calculated.

Figure 3A:
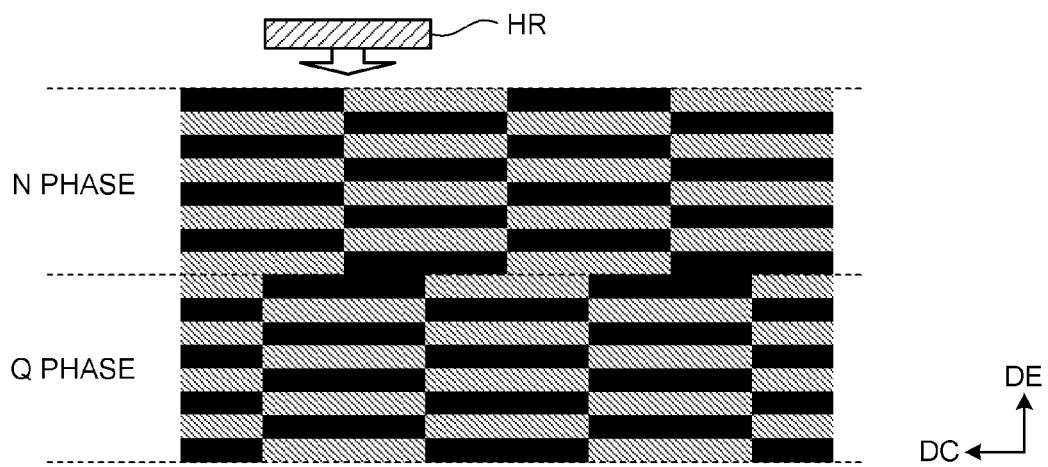
FIG. 3A is a plan view illustrating an example of a null-type burst pattern.
Figure 3B:
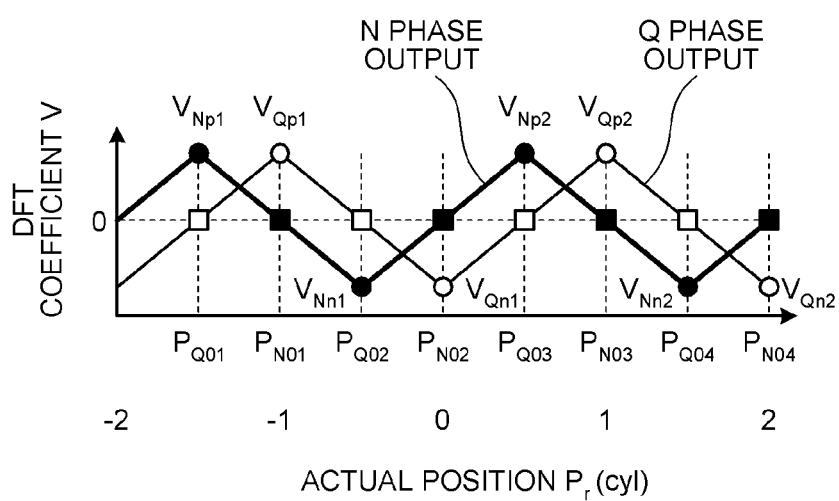
FIG. 3B is a view illustrating a relationship between a DFT coefficient of a burst output fundamental wave in the null-type burst pattern in FIG. 3A, and an actual position of a magnetic head.

FIG. 3A is a plan view illustrating an example of a null-type burst pattern, and FIG. 3B is a view illustrating a relationship between a DFT coefficient of a burst output fundamental wave in the null-type burst pattern in FIG. 3A, and an actual position of a magnetic head.

In FIG. 3A, the null-type burst pattern includes an N phase and a Q phase. Meanwhile, when the magnetic head HM traces the track T, if the magnetic head HM crosses over the null-type burst pattern in which the polarities are inverted, signals read from the inverted portion of the polarity cancel each other. Hence, when the rate of the inverted portion and a non-inverted portion of the polarity read by the magnetic head HM changes according to the position in the cross track direction DC, the burst output fluctuates according to this rate, and, when the rate of the inverted portion and the non-inverted portion of the polarity becomes equal, the burst output becomes 0.

Hence, as illustrated in FIG. 3B, according to an actual position $P_r$ of the magnetic head HM in the cross track direction, N phase positive side peaks $V_{Np1}$ and $V_{Np2}$ and N phase negative side peaks $V_{Nn1}$ and $V_{Nn2}$ appear in the DFT coefficient V of an N phase output, and Q phase positive side peaks $V_{Qp1}$ and $V_{Qp2}$ and Q phase negative side peaks $V_{Qn1}$ and $V_{Qn2}$ appear in the DFT coefficient V of a Q phase output.

For example, when the actual position $P_r$ is at a position of $-1.5$ cyl, the DFT coefficient V of the N phase is the N phase positive side peak $V_{Np1}$. When the actual position $P_r$ is at a position of $-0.5$ cyl, the magnetization pattern of the N phase is shifted 180 degrees in a down track direction, and therefore the DFT coefficient V is the N phase negative side peak $V_{Nn1}$. Thus, the DFT coefficients V of the N phase output and the Q phase output change according to the actual position $P_r$ of the magnetic head HM, so that it is possible to decide the actual position $P_r$ of the magnetic head HM by measuring the DFT coefficient.

Meanwhile, when, for example, a track pitch upon servo writing fluctuates in the null-type burst pattern in FIG. 3A, the DFT coefficients V of the N phase output and the Q phase output are shifted, and an error is produced in the demodulation position of the actual position $P_r$ of the magnetic head HM. Consequently, by calculating as an offset correction value a shift of the DFT coefficient V subject to fluctuation of the track pitch of the null-type burst pattern, and adding this offset correction value to the DFT coefficient V, it is possible to cancel an error in the demodulation position of the actual position $P_r$ of the magnetic head HM.

This offset correction value can be calculated as follows. (1) N phase and Q phase outputs are measured at each off track position. (2) An N phase offset correction value is calculated from the N phase output at "an off track position at which the N phase output comes to a peak" or at "an off track position at which the Q phase output becomes 0". In this case, the N phase offset correction value can be given according to following equation 1. (3) A Q phase offset correction value is calculated from a Q phase output at "an off track position at which the Q phase output comes to a peak" or at "an off track position at which the N phase output becomes 0". In this case, the Q phase offset correction value can be given according to following equation 2.

[Equation 1]

$$V_{Nf} = \frac{1}{2}\left(\frac{1}{M_{Np}}\sum_{i=1}^{M_{Np}} V_{Npi} + \frac{1}{M_{Nn}}\sum_{i=1}^{M_{Nn}} V_{Nni}\right) \quad (1)$$

[Equation 2]

$$V_{Qf} = \frac{1}{2}\left(\frac{1}{M_{Qp}}\sum_{i=1}^{M_{Qp}} V_{Qpi} + \frac{1}{M_{Qn}}\sum_{i=1}^{M_{Qn}} V_{Qni}\right) \quad (2)$$

where $V_{Nf}$:N phase offset correction value, $V_{Qf}$:Q phase offset correction value, $V_{Np}$:N phase positive side peak output, $M_{Np}$:the number of measured N phase positive side peak outputs, $V_{Nn}$:N phase negative side peak output, $M_{Nn}$:the number of measured N phase negative side peak outputs, $V_{Qp}$:Q phase positive side peak output, $M_{Qp}$:the number of measured Q phase positive side peaks, $V_{Qn}$:Q phase negative side peak output, and $M_{Qn}$:the number of measured Q phase negative side peak outputs.

Figure 4:
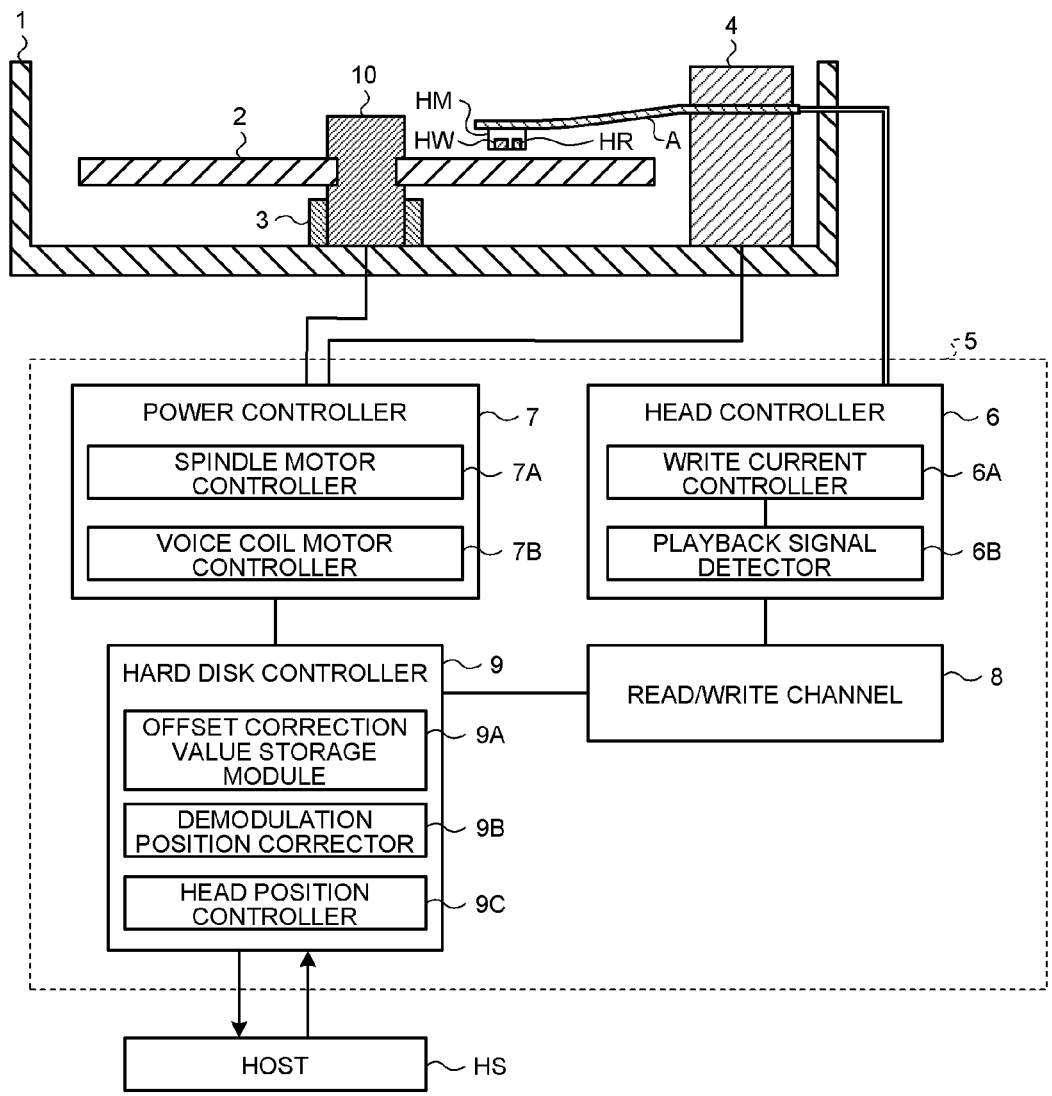
FIG. 4 is a block diagram illustrating a schematic configuration of reading and writing in a data area in the magnetic disk of the magnetic disk device in FIG. 1.

FIG. 4 is a block diagram illustrating a schematic configuration of reading and writing the data areas DA in the magnetic disk device in FIG. 1.

In FIG. 4, in test process before product shipping, after an offset correction value is written in the offset correction value storage module 9A, the products are shipped.

Further, upon use after product shipping, the magnetic recording controller 5 is connected to the host HS. In addition, the host HS may be a personal computer which issues a write command or a read command to a magnetic disk device, or an external interface.

Further, a signal is read from the magnetic disk 2 through the read head HR while the magnetic disk 2 is rotated by the spindle motor 3, and is detected by the playback signal detector 6B. The signal detected by the playback signal detector 6B is converted into data by the read/write channel 8, and is sent to the hard disk controller 9. Further, the hard disk controller 9 calculates the demodulation position of the magnetic head HM based on the burst pattern 23 detected by the playback signal detector 6B. In this case, the demodulation position corrector 9B reads the offset correction value from the offset correction value storage module 9A, and corrects the demodulation position of the magnetic head HM based on the offset correction value. Further, the head position controller 9C performs tracking control such that the magnetic head 2 traces the track T based on a correction result of the demodulation position of the magnetic head HM.

That is, the demodulation position corrector 9B acquires the DFT coefficient V by performing DFT computation for a playback output of the burst pattern 23 obtained at an off track position. Further, the demodulation position corrector 9B corrects the burst output by adding the offset correction value to the DFT coefficient V. Meanwhile, when an N phase DFT coefficient which is not yet corrected is $V_{Ni}$ and an N phase offset correction value is $V_{Nf}$ the corrected N phase DFT coefficient $V_N$ can be given according to following equation 3. Further, a Q phase DFT coefficient which is not yet corrected is $V_{Qi}$ and a Q phase offset correction value is $V_{Qf}$ the corrected Q phase DFT coefficient $V_Q$ can be given according to following equation 4.

$$VN = VNi - VNf \quad (3)$$

$$VQ = VQi - VQf \quad (4)$$

When the N phase DFT coefficient $V_N$ and the Q phase DFT coefficient $V_Q$ can be obtained from a playback signal output at each off track position, the position can be demodulated using these N phase DFT coefficient $V_N$ and the Q phase DFT coefficient $V_Q$.

In this case, under conditions of "$V_N+V_Q$" and "$V_N-V_Q$", a partitioned demodulation position $P_{d0}$ can be given according to following equations.

$V_N+V_Q<0$ and $V_N-V_Q>0 \rightarrow P_{d0}=V_N/(2_{VNmax})$ $V_N+V_Q>0$ and $V_N-V_Q>0 \rightarrow P_{d0}=V_Q/(2_{VQmax})$ $V_N+V_Q>0$ and $V_N-V_Q<0 \rightarrow P_{d0}=-V_N/2_{VNmax})$ $V_N+V_Q<0$ and $V_N+V_Q<0 \rightarrow P_{d0}=-V_Q/2_{VQmax})$ Where $V_{Nmax}$ and $V_{Qmax}$ are maximum values of absolute values of the N phase DFT coefficient $V_N$ and the Q phase DFT coefficient $V_Q$ which fluctuate according to an off track position.

Figure 5A:
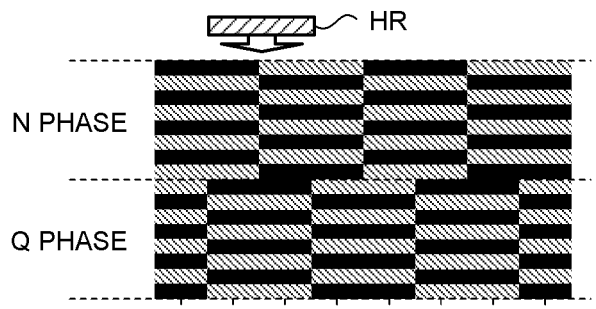
FIG. 5A is a plan view illustrating an example of a null-type burst pattern when a servo write pitch does not fluctuate.
Figure 5B:
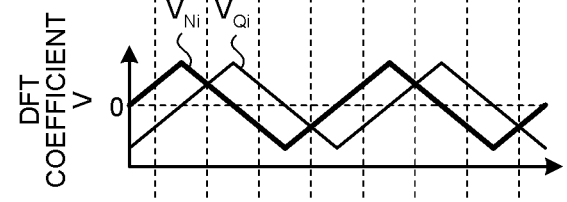
FIG. 5B is a view illustrating a relationship between a DFT coefficient value of a burst output fundamental wave in the null-type burst pattern in FIG. 5A, and an actual position of a magnetic head.
Figure 5C:
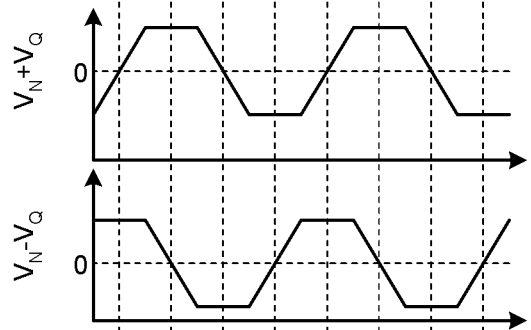
FIG. 5C is a view illustrating a relationship between an addition value of an N phase output and a Q phase output in FIG. 5B, and an actual position of the magnetic head.
Figure 5D:
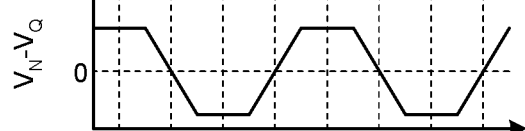
FIG. 5D is a view illustrating a relationship between a difference between the N phase output and the Q phase output in FIG. 5B, and the actual position of the magnetic head.
Figure 5E:
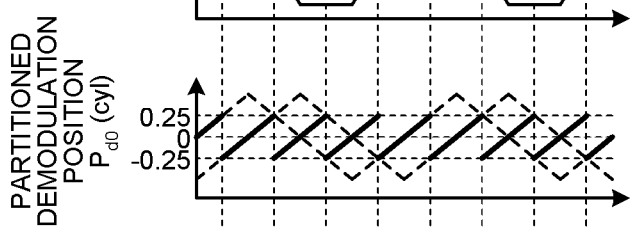
FIG. 5E is a view illustrating a relationship between a partitioned demodulation position found from the N phase output and the Q phase output in FIG. 5B, and the actual position of the magnetic head.
Figure 5F:
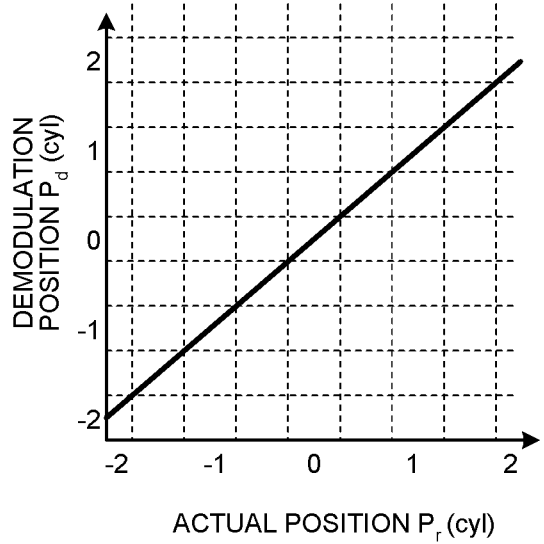
FIG. 5F is a view illustrating a relationship between a demodulation position found from the partitioned demodulation position in FIG. 5E, and the actual position of the magnetic head.

FIG. 5A is a plan view illustrating an example of a null-type burst pattern when a servo write pitch does not fluctuate, FIG. 5B is a view illustrating a relationship between a DFT coefficient value of a burst output fundamental wave in the null-type burst pattern in FIG. 5A, and an actual position of a magnetic head, FIG. 5C is a view illustrating a relationship between an addition value of an N phase output and a Q phase output in FIG. 5B, and an actual position of the magnetic head, FIG. 5D is a view illustrating a relationship between a difference between the N phase output and the Q phase output in FIG. 5B, and the actual position of the magnetic head, FIG. 5E is a view illustrating a relationship between a partitioned demodulation position found from the N phase output and the Q phase output in FIG. 5B, and the actual position of the magnetic head, and FIG. 5F is a view illustrating a relationship between a demodulation position found from the partitioned demodulation position in FIG. 5E, and the actual position of the magnetic head.

In FIG. 5A, when a servo write pitch does not fluctuate in the null-type burst pattern, the N phase DFT coefficient $V_{Ni}$ and the Q phase DFT coefficient $V_{Qi}$ are symmetrical about a point with respect to an N phase zero cross and a Q phase zero cross as illustrated in FIG. 5B. Hence, as illustrated in FIGS. 5C and 5D, an addition value and a difference thereof are symmetrical about a point with respect to each zero cross. In this case, as illustrated in FIG. 5E, the actual position $P_r$ and the partitioned demodulation position $P_{d0}$ have a linear relationship in each partitioned area. Further, as illustrated in FIG. 5F, by shifting the partitioned area adjacent in each partitioned area by 0.5 cyl, it is possible to generate the continuous demodulation position $P_d$ across the partitioned areas.

Figure 6A:
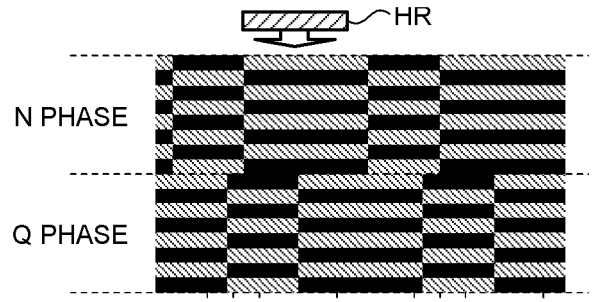
FIG. 6A is a plan view illustrating an example of a null-type burst pattern when a servo write pitch fluctuates.
Figure 6B:
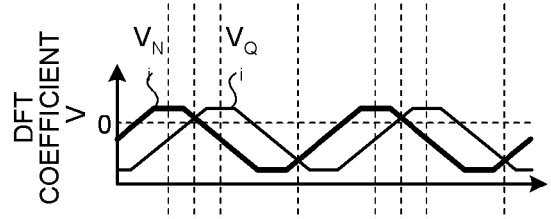
FIG. 6B is a view illustrating a relationship between a DFT coefficient value of a burst output fundamental wave in the null-type burst pattern in FIG. 6A, and the actual position of the magnetic head.
Figure 6C:
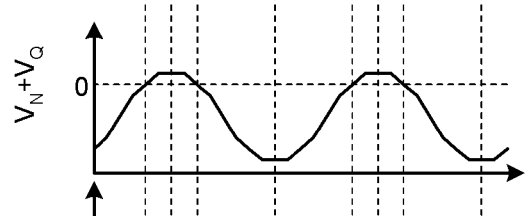
FIG. 6C is a view illustrating a relationship between an addition value of an N phase output and a Q phase output in FIG. 6B, and an actual position of the magnetic head.
Figure 6D:
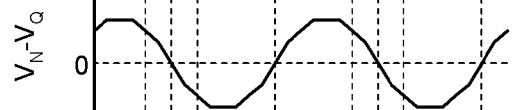
FIG. 6D is a view illustrating a relationship between a difference between the N phase output and the Q phase output in FIG. 6B, and the actual position of the magnetic head.
Figure 6E:
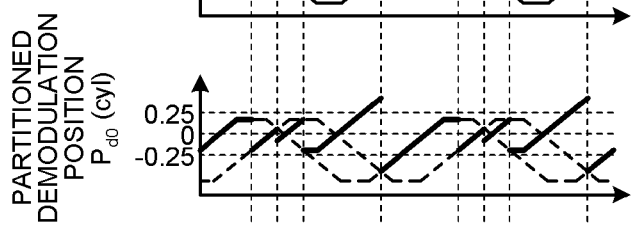
FIG. 6E is a view illustrating a relationship between a partitioned demodulation position found from the N phase output and the Q phase output in FIG. 6B, and the actual position of the magnetic head.
Figure 6F:
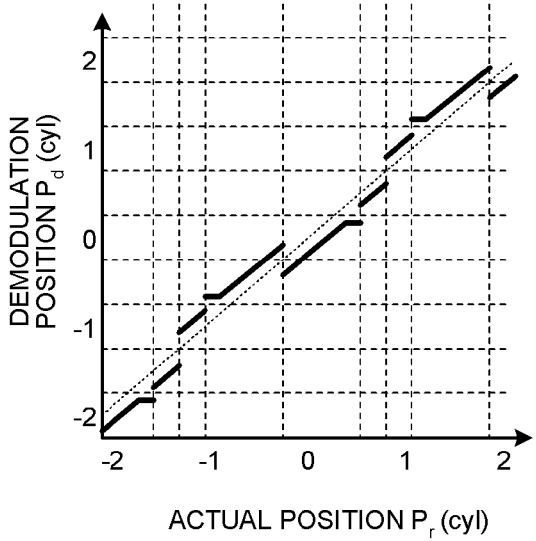
FIG. 6F is a view illustrating a relationship between a demodulation position found from the partitioned demodulation position in FIG. 6E, and the actual position of the magnetic head.

FIG. 6A is a plan view illustrating an example of a null-type burst pattern when a servo write pitch fluctuates, FIG. 6B is a view illustrating a relationship between a DFT coefficient value of a burst output fundamental wave in the null-type burst pattern in FIG. 6A, and the actual position of the magnetic head, FIG. 6C is a view illustrating a relationship between an addition value of an N phase output and a Q phase output in FIG. 6B, and an actual position of the magnetic head, FIG. 6D is a view illustrating a relationship between a difference between the N phase output and the Q phase output in FIG. 6B, and the actual position of the magnetic head, FIG. 6E is a view illustrating a relationship between a partitioned demodulation position found from the N phase output and the Q phase output in FIG. 6B, and the actual position of the magnetic head, and FIG. 6F is a view illustrating a relationship between a demodulation position found from the partitioned demodulation position in FIG. 6E, and the actual position of the magnetic head.

In FIG. 6A, when a feed pitch fluctuates upon servo writing, a track pitch fluctuates in the null-type burst pattern. In this case, as illustrated in FIG. 6B, according to a magnetization pattern of a wider pattern width, the N phase DFT coefficient $V_{Ni}$ and the Q phase DFT coefficient $V_{Qi}$ are small compared to a magnetization pattern of a narrower pattern width, and positive and negative outputs of the N phase DFT coefficient $V_{Ni}$ and the Q phase DFT coefficient $V_{Qi}$ are asymmetrical. In addition, shifts of the N phase DFT coefficient $V_{Ni}$ and the Q phase DFT coefficient $V_{Qi}$ are referred to as an "N phase offset" in the N phase, and a "Q phase offset" in the Q phase. Hence, as illustrated in FIGS. 6C and 6D, an addition value and a difference thereof are asymmetrical with respect to each zero cross. In this case, as illustrated in FIG. 6E, the actual position $P_r$ and the partitioned demodulation position $P_{d0}$ have a non-linear relationship in each partitioned area. Therefore, as illustrated in FIG. 6F, when the demodulation position $P_d$ is generated from the partitioned demodulation position $P_{d0}$, the demodulation position $P_d$ is shifted from the actual position $P_r$.

Figure 7A:
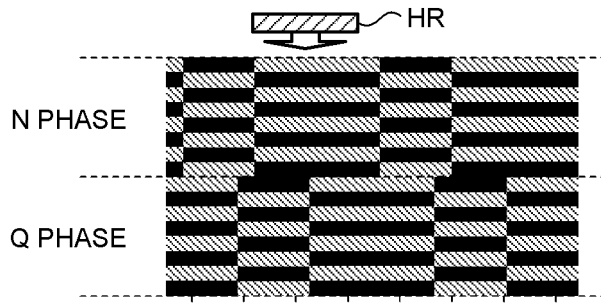
FIG. 7A is a plan view illustrating an example of a null-type burst pattern after offset correction when a servo write pitch fluctuates.
Figure 7B:
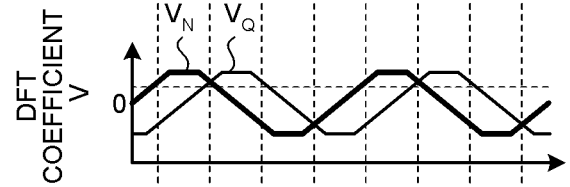
FIG. 7B is a view illustrating a relationship between a DFT coefficient value of a burst output fundamental wave in the null-type burst pattern in FIG. 7A, and an actual position of a magnetic head.
Figure 7C:
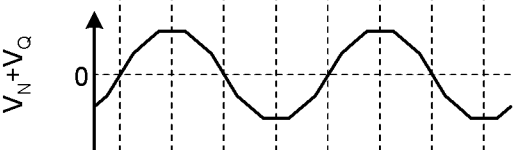
FIG. 7C is a view illustrating a relationship between an addition value of an N phase output and a Q phase output in FIG. 7B, and an actual position of the magnetic head.
Figure 7D:
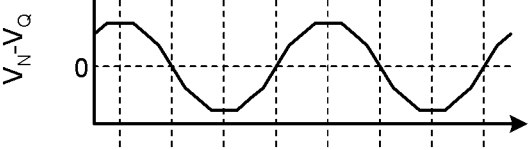
FIG. 7D is a view illustrating a relationship between a difference between the N phase output and the Q phase output in FIG. 7B, and the actual position of the magnetic head.
Figure 7E:
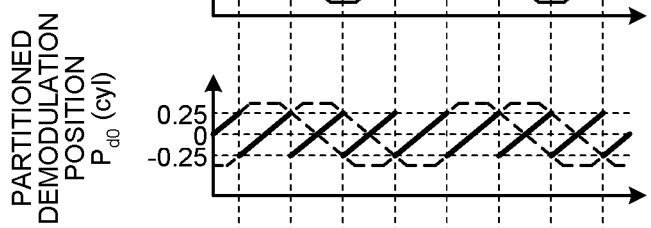
FIG. 7E is a view illustrating a relationship between a partitioned demodulation position found from the N phase output and the Q phase output in FIG. 7B, and the actual position of the magnetic head.
Figure 7F:
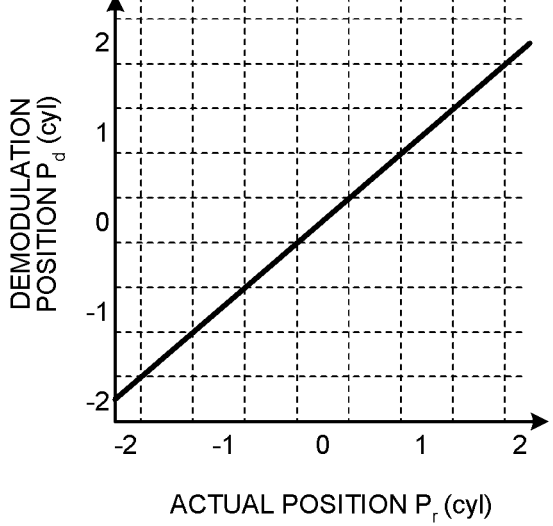
FIG. 7F is a view illustrating a relationship between a demodulation position found from the partitioned demodulation position in FIG. 7E, and the actual position of the magnetic head.

FIG. 7A is a plan view illustrating an example of a null-type burst pattern after offset correction when a servo write pitch fluctuates, FIG. 7B is a view illustrating a relationship between a DFT coefficient value of a burst output fundamental wave in the null-type burst pattern in FIG. 7A, and an actual position of a magnetic head, FIG. 7C is a view illustrating a relationship between an addition value of an N phase output and a Q phase output in FIG. 7B, and an actual position of the magnetic head, FIG. 7D is a view illustrating a relationship between a difference between the N phase output and the Q phase output in FIG. 7B, and the actual position of the magnetic head, FIG. 7E is a view illustrating a relationship between a partitioned demodulation position found from the N phase output and the Q phase output in FIG. 7B, and the actual position of the magnetic head, and FIG. 7F is a view illustrating a relationship between a demodulation position found from the partitioned demodulation position in FIG. 7E, and the actual position of the magnetic head.

In FIG. 7A, a track pitch fluctuates in a null-type burst pattern in the same fashion as in as in FIG. 6A. In this case, as illustrated in FIG. 7B, the N phase offset correction value $V_{Nf}$ and the Q phase offset correction value $V_{Qf}$ are added to the N phase DFT coefficient $V_{Ni}$ and the Q phase DFT coefficient $V_{Qi}$, the N phase DFT coefficient $V_N$ and the Q phase DFT coefficient $V_Q$ are generated. Consequently, it is possible to improve asymmetry of positive and negative outputs of the N phase DFT coefficient $V_{Ni}$ and the Q phase DFT coefficient $V_{Qi}$, and, as illustrated in FIGS. 7C and 7D, improve asymmetry of positive and negative outputs of an addition value and a difference thereof. In this case, as illustrated in FIG. 7E, it is possible to improve linearity of the partitioned demodulation position $P_{d0}$ with respect to the actual position $P_r$ in each partitioned area. Further, as illustrated in FIG. 7F, when the demodulation position $P_d$ is generated from the partitioned demodulation position $P_{d0}$, it is possible to improve a shift of the demodulation position $P_d$ from the actual position $P_r$.

Second Embodiment

Figure 8:
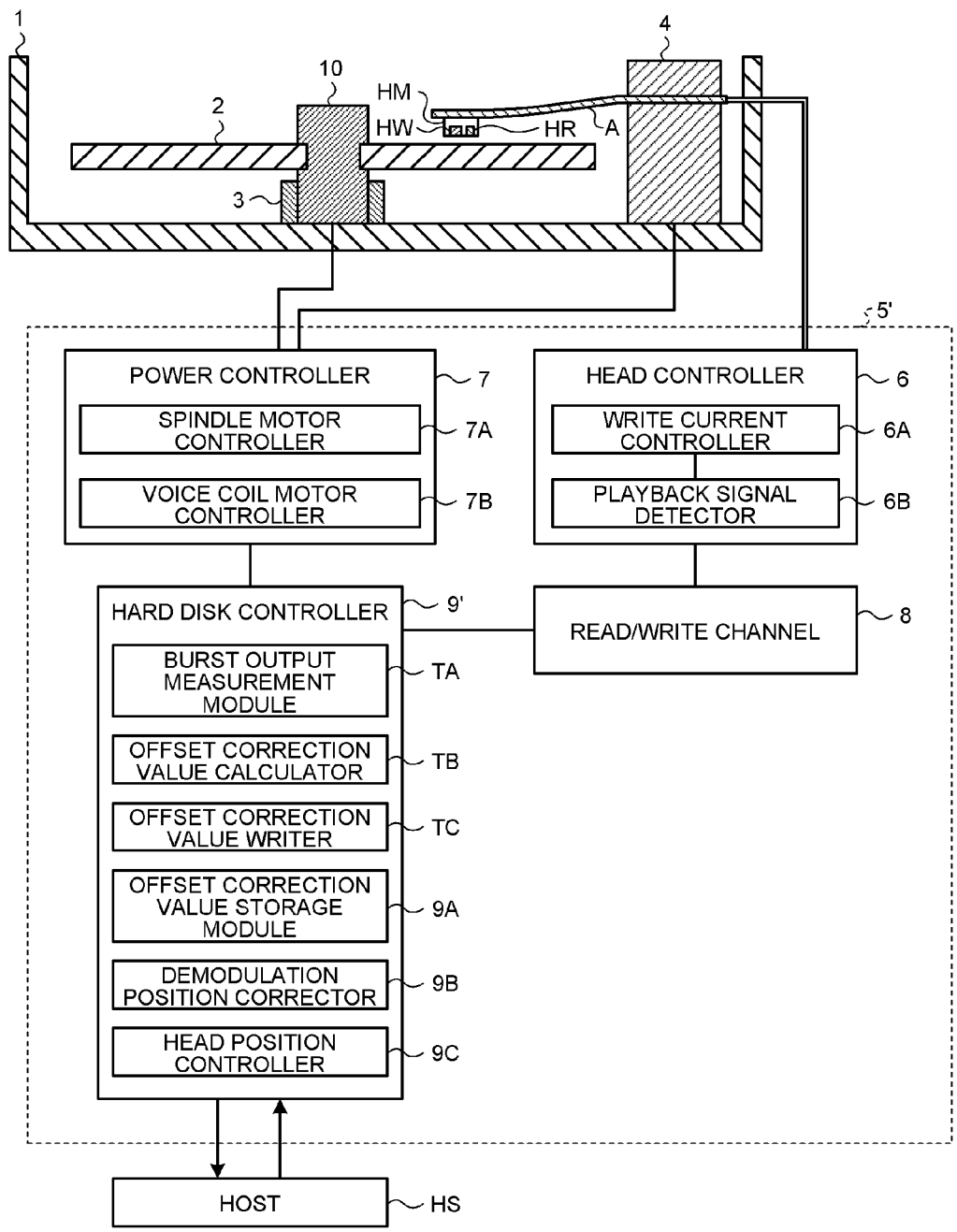
FIG. 8 is a block diagram illustrating a schematic configuration of a magnetic disk device according to a second embodiment.

FIG. 8 is a block diagram illustrating a schematic configuration of a magnetic disk device according to a second embodiment.

In FIG. 8, this magnetic disk device has a magnetic recording controller 5' instead of a magnetic recording controller 5 in FIG. 4, and the magnetic recording controller 5' has a hard disk controller 9' instead of a hard disk controller 9. The hard disk controller 9' additionally has a burst output measurement module TA, an offset correction value calculator TB and an offset correction value writer TC in FIG. 1 compared to the hard disk controller 9 in FIG. 4.

Meanwhile, by adding the burst output measurement module TA, the offset correction value calculator TB and the offset correction value writer TC in FIG. 1 to the hard disk controller 9 in FIG. 4, it is possible to update an offset correct value after product shipping.

Third Embodiment

Figures 9A, 9B:
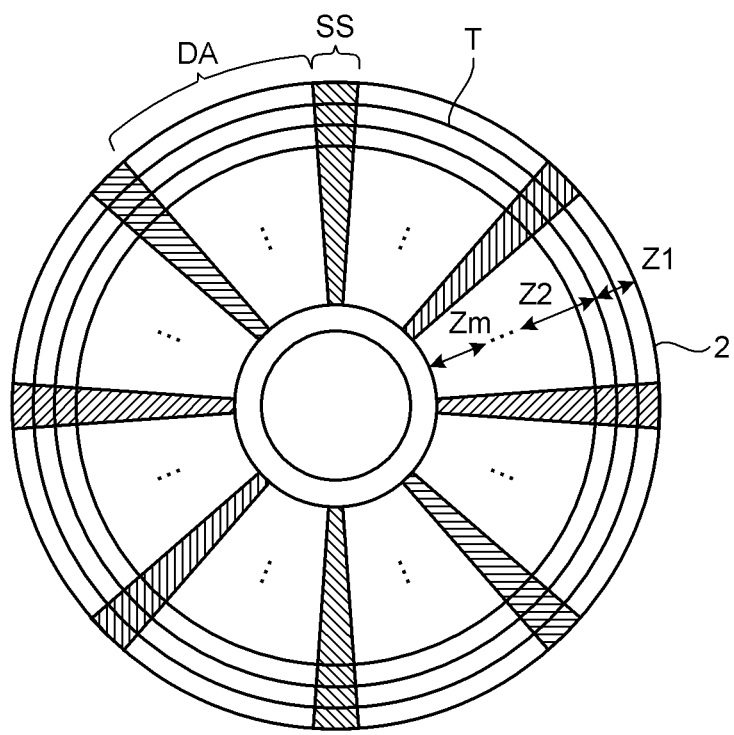
FIG. 9A is a plan view illustrating a method of setting zone of a magnetic disk according to a third embodiment.
FIG. 9B is a view illustrating an example of an offset correction value set per zone in FIG. 9A.

FIG. 9A is a plan view illustrating a method of setting a magnetic disk zone according to a third embodiment, and FIG. 9B is a view illustrating an example of an offset correction value set per zone in FIG. 9A.

Although a common offset correction value may be used for all areas of a magnetic disk 2 in FIG. 9A, when a track pitch fluctuates differently on the magnetic disk 2, the magnetic disk 2 may be partitioned according to the magnitude of track pitch fluctuation and an offset correction value may be set per partitioned area. For example, the magnetic disk 2 is divided in a radial direction and, as illustrated in FIG. 9B, N phase offset correction values $V_{Nf1}$ to $V_{Nfm}$ and Q phase offset correction values $V_{Qf1}$ to $V_{Qfm}$ may be set per divided zones Z1 to Zm (m is an integer equal to or more than 2).

Fourth Embodiment

Figure 10A:
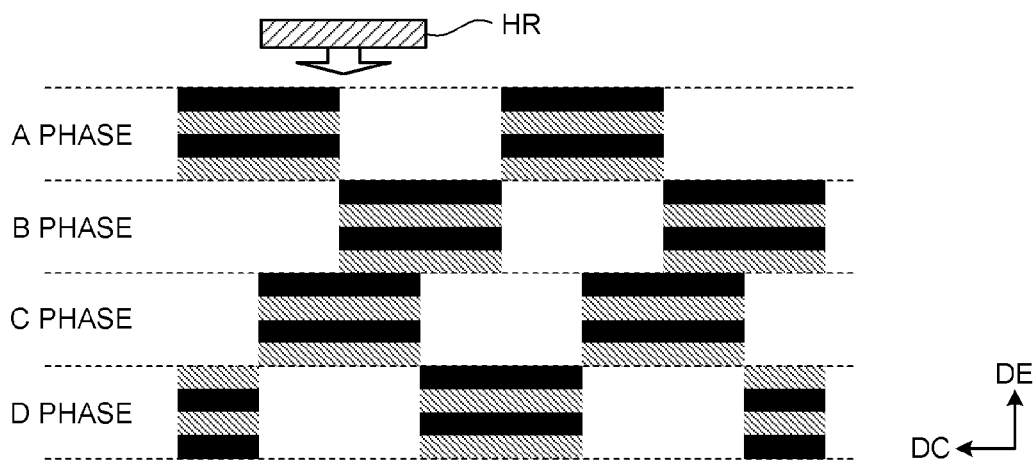
FIG. 10A is a plan view illustrating an example of an area-type burst pattern used in a magnetic disk device according to a fourth embodiment.
Figure 10B:
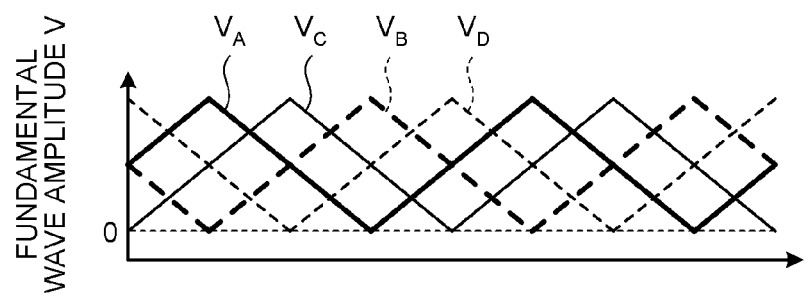
FIG. 10B is a view illustrating a relationship between a fundamental wave amplitude of a burst output in the area-type burst pattern in FIG. 10A, and an actual position of the magnetic head.
Figure 10C:
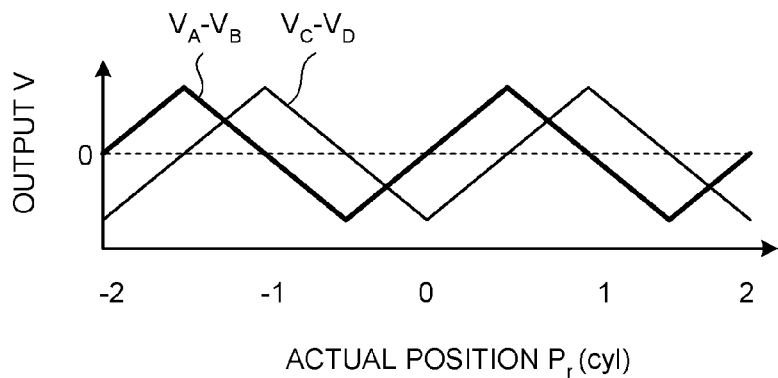
FIG. 10C is a view illustrating a relationship between a difference in the fundamental wave amplitude of the burst output in FIG. 10B, and the actual position of the magnetic head.

FIG. 10A is a plan view illustrating an example of an area-type burst pattern used in a magnetic disk device according to a fourth embodiment, FIG. 10B is a view illustrating a relationship between a fundamental wave amplitude of a burst output in the area-type burst pattern in FIG. 10A, and an actual position of the magnetic head, and FIG. 10C is a view illustrating a relationship between a difference in the fundamental wave amplitude of the burst output in FIG. 10B, and the actual position of the magnetic head.

In FIG. 10A, an area-type burst pattern may be used as a burst pattern 23 instead of a null-type burst pattern. This area-type burst pattern includes an A phase, a B phase, a C phase and a D phase. The A phase and the B phase can be used to determine the center of the track T, and the C phase and the D phase can be used to determine whether the track T is an even-numbered or odd-numbered track. Further, for example, in the adjacent tracks T1 to T4, the A phase and the B phase can be arranged across the boundaries of tracks T1 to T4, and the C phase and the D phase can be arranged across the center lines of the tracks T1 to T4. In this case, the A phase can be arranged at an odd-numbered boundary of the boundaries of the tracks T1 to T4, and the B phase can be arranged at an even-numbered boundary of the boundaries of the tracks T1 to T4. The C phase can be arranged in the odd-numbered tracks T1 and T3 of the tracks T1 to T4, and the D phase can be arranged in the even-numbered tracks T2 and T4 of the tracks T1 to T4.

Further, as illustrated in FIG. 10B, phases of an A phase amplitude $V_A$, a B phase amplitude $V_B$, a C phase amplitude $V_C$ and a D phase amplitude $V_D$ are shifted 90 degrees according to an actual position $P_r$ of the magnetic head HM in a cross track direction DC.

Meanwhile, according to the area-type burst pattern, by finding the difference between two phases, it is possible to find an N phase output $V_{Ni}$ and a Q phase output $V_{Qi}$ similar to an N phase burst output and a Q phase burst output of the null-type burst pattern.

When, for example,

N phase output $V_{Ni}$=A phase amplitude $V_A$−B phase amplitude $V_B$, and

Q phase output $V_{Qi}$=C phase amplitude $V_C$−D phase amplitude $V_D$ are true, it is possible to correct an offset in the area-type burst pattern in the same fashion as in a null-type burst pattern by using equation 3 and equation 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic head;
    a magnetic disk comprises a burst pattern recorded thereon for determining a position of the magnetic head on a track based on a reading result by the magnetic head; and
    a magnetic recording controller configured to calculate a demodulation position of the magnetic head based on the burst pattern that is read and correct the calculated demodulation position based on an offset correction value subject to fluctuation of the burst pattern, wherein
    the offset correction value comprises an N phase offset correction value and a Q phase offset correction value,
    the N phase offset correction value is calculated based on an addition result of an N phase positive side output and an N phase negative side output at an off track position at which an N phase output obtained from the burst pattern comes to a peak or at an off track position at which a Q phase output is zero, and
    the Q phase offset correction value is calculated based on an addition result of a Q phase positive side output and a Q phase negative side output at an off track position at which a Q phase output obtained from the burst pattern comes to a peak or at an off track position at which an N phase output is zero.

2. The magnetic disk device of claim 1, wherein the magnetic recording controller comprises:
    an offset correction value storage module configured to store the offset correction value;
    a demodulation position corrector configured to correct the demodulation position of the magnetic head based on the offset correction value; and
    a head position controller configured to control a position of the magnetic head based on a correction result of the demodulation position.

3. The magnetic disk device of claim 2, wherein the burst pattern comprises a null-type burst pattern including an N phase and a Q phase.

4. The magnetic disk device of claim 2, wherein
    the burst pattern comprises an area-type burst pattern including an A phase, a B phase, a C phase and a D phase, and
    an N phase output is found based on a difference between an A phase amplitude and a B phase amplitude, and a Q phase output is found based on a difference between a C phase amplitude and a D phase amplitude.

5. The magnetic disk device of claim 2, wherein the offset correction value is set per zone by dividing the magnetic disk in a radial direction.

6. The magnetic disk device of claim 1, wherein the burst pattern comprises a null-type burst pattern including an N phase and a Q phase.

7. The magnetic disk device of claim 6, wherein the offset correction value is set per zone by dividing the magnetic disk in a radial direction.

8. The magnetic disk device of claim 1, wherein
the burst pattern comprises an area-type burst pattern including an A phase, a B phase, a C phase and a D phase, and
an N phase output is found based on a difference between an A phase amplitude and a B phase amplitude, and a Q phase output is found based on a difference between a C phase amplitude and a D phase amplitude.

9. The magnetic disk device of claim 8, wherein the offset correction value is set per zone by dividing the magnetic disk in a radial direction.

10. The magnetic disk device of claim 1, wherein the offset correction value is set per zone by dividing the magnetic disk in a radial direction.

11. A method of correcting a demodulation position comprising:
reading a burst pattern recorded on a magnetic disk by a magnetic head; and
correcting the demodulation position of the magnetic head obtained from the burst pattern, based on an offset correction value subject to fluctuation of the burst pattern, wherein
the offset correction value includes an N phase offset correction value and a Q phase offset correction value,
the N phase offset correction value is calculated based on an addition result of an N phase positive side output and an N phase negative side output at an off track position at which an N phase output obtained from the burst pattern comes to a peak or at an off track position at which a Q phase output is zero, and
the Q phase offset correction value is calculated based on an addition result of a Q phase positive side output and a Q phase negative side output at an off track position at which a Q phase output obtained from the burst pattern comes to a peak or at an off track position at which an N phase output is zero.

12. The method of claim 11, further comprising:
calculating the offset correction value based on a burst output obtained from the burst pattern;
writing the offset correction value in an offset correction value storage module;
correcting the demodulation position of the magnetic head obtained from the burst pattern, based on the offset correction value written in the offset correction value storage module; and
controlling a position of the magnetic head based on a correction result of the demodulation position.

13. The method of claim 12, wherein the offset correction value is set per zone by dividing the magnetic disk in a radial direction.

14. The method of claim 12, wherein the burst pattern comprises a null-type burst pattern including an N phase and a Q phase.

15. The method of claim 12, wherein
the burst pattern comprises an area-type burst pattern including an A phase, a B phase, a C phase and a D phase, and
an N phase output is found based on a difference between an A phase amplitude and a B phase amplitude, and a Q phase output is found based on a difference between a C phase amplitude and a D phase amplitude.

16. The method of claim 11, wherein the burst pattern comprises a null-type burst pattern including an N phase and a Q phase.

17. The method of claim 16, wherein the offset correction value is set per zone by dividing the magnetic disk in a radial direction.

18. The method of claim 11, wherein
the burst pattern comprises an area-type burst pattern including an A phase, a B phase, a C phase and a D phase, and
an N phase output is found based on a difference between an A phase amplitude and a B phase amplitude, and a Q phase output is found based on a difference between a C phase amplitude and a D phase amplitude.

19. The method of claim 18, wherein the offset correction value is set per zone by dividing the magnetic disk in a radial direction.

20. The method of claim 11, wherein the offset correction value is set per zone by dividing the magnetic disk in a radial direction.

* * * * *